(12) United States Patent
Wang et al.

(10) Patent No.: US 8,720,310 B2
(45) Date of Patent: May 13, 2014

(54) SOCKET WRENCH WITH AN ENERGY-SAVING FUNCTION

(76) Inventors: Yen-Hui Wang, Taichung (TW); Sin-Heng Wang, Taichung (TW); Tsun-Te Wang, Taichung (TW)

( * ) Notice: Subject to any disclaimer, the term of this patent is extended or adjusted under 35 U.S.C. 154(b) by 213 days.

(21) Appl. No.: 13/460,935

(22) Filed: May 1, 2012

(65) Prior Publication Data

US 2013/0291690 A1    Nov. 7, 2013

(51) Int. Cl.
- *B25B 13/06* (2006.01)
- *B25B 13/00* (2006.01)
- *B25B 23/00* (2006.01)

(52) U.S. Cl.
CPC ............... *B25B 13/06* (2013.01); *B25B 23/00* (2013.01)
USPC ......................................... 81/124.6; 81/177.2

(58) Field of Classification Search
USPC ............. 81/124.6, 124.7, 177.1, 177.2, 180.1
See application file for complete search history.

(56) References Cited

U.S. PATENT DOCUMENTS

| | | | | |
|---|---|---|---|---|
| 3,175,436 A | * | 3/1965 | Coleman | 81/177.1 |
| 4,070,931 A | * | 1/1978 | Florko, Jr. | 81/121.1 |
| 4,104,936 A | * | 8/1978 | Sjostrom | 81/180.1 |
| 4,537,101 A | * | 8/1985 | Eversole | 81/180.1 |
| 5,138,914 A | * | 8/1992 | Brickner | 81/451 |
| 5,499,554 A | * | 3/1996 | Ilyes | 81/55 |
| 5,528,964 A | * | 6/1996 | Smith, Jr. | 81/180.1 |
| 6,330,845 B1 | * | 12/2001 | Meulink | 81/462 |

* cited by examiner

*Primary Examiner* — David B Thomas
(74) *Attorney, Agent, or Firm* — Alan Kamrath; Kamrath IP Lawfirm, P.A.

(57) ABSTRACT

A socket wrench includes a handle and an actuating head connected with the handle. The handle has a first end provided with a mounting portion and a second end provided with a grip. The mounting portion of the handle has an inner wall provided with a pivot hole pivotally mounted on the actuating head and has an outer wall provided with a first driving arm and a second driving arm. The actuating head has an upper end provided with an extension which has a distal end provided with an elongate guide slot. Each of the first driving arm and the second driving arm of the handle is slidably mounted in the guide slot of the actuating head. The actuating head has a lower end inserted into a socket which is mounted on one bolt of a wheel.

3 Claims, 6 Drawing Sheets

SOCKET WRENCH WITH AN ENERGY-SAVING FUNCTION

BACKGROUND OF THE INVENTION

1. Field of the Invention

The present invention relates to a wrench and, more particularly, to a socket wrench for operating a workpiece such as a bolt, nut and the like.

2. Description of the Related Art

A conventional socket wrench comprises a socket and a handle connected with the socket. The handle has a first end provided with a driving head and a second end provided with a grip. The driving head of the handle is inserted into the socket to drive the socket. In operation, when the socket is mounted on a bolt, the handle is driven by a user to drive the driving head which drives the socket to rotate the bolt so as to tighten or loosen the bolt. However, the conventional socket wrench does not have an energy-saving mechanism so that the user has to apply a larger force on the handle so as to tighten or loosen the bolt, thereby wasting the user's energy and time.

BRIEF SUMMARY OF THE INVENTION

In accordance with the present invention, there is provided a socket wrench, comprising a handle and an actuating head connected with the handle. The handle has a first end provided with a mounting portion and a second end provided with a grip. The mounting portion of the handle is mounted on the actuating head. The mounting portion of the handle has an inner wall provided with a pivot hole. The pivot hole of the handle is pivotally mounted on the actuating head. The mounting portion of the handle has an outer wall provided with a first driving arm and a second driving arm. The first driving arm of the handle has a substantially L-shaped profile. The second driving arm of the handle has a substantially L-shaped profile. The actuating head is connected with the mounting portion of the handle by a snap ring. The snap ring is secured on the actuating head and abuts a bottom side of the pivot hole of the handle. The actuating head is extended through the pivot hole of the handle. The actuating head has an upper end provided with an extension protruding outward from the mounting portion of the handle. The extension of the actuating head has a distal end provided with an elongate guide slot which receives the first driving arm of the handle and the second driving arm of the handle. Each of the first driving arm and the second driving arm of the handle is slidably mounted in the guide slot of the actuating head. The guide slot of the actuating head has a substantially arc-shaped profile.

Preferably, the handle has a fixed length or a retractable length.

Preferably, the actuating head has a lower end protruding outward from the mounting portion of the handle and inserted into a socket. The socket is mounted on one of a plurality of bolts of a wheel.

The primary objective of the present invention is to provide a socket wrench with an energy-saving function.

According to the primary advantage of the present invention, each of the first driving arm and the second driving arm of the handle produces a leverage to the extension to drive the actuating head and the socket so as to rotate each of the bolts of the wheel in an energy-saving manner, thereby facilitating a user operating the handle to rotate each of the bolts of the wheel.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
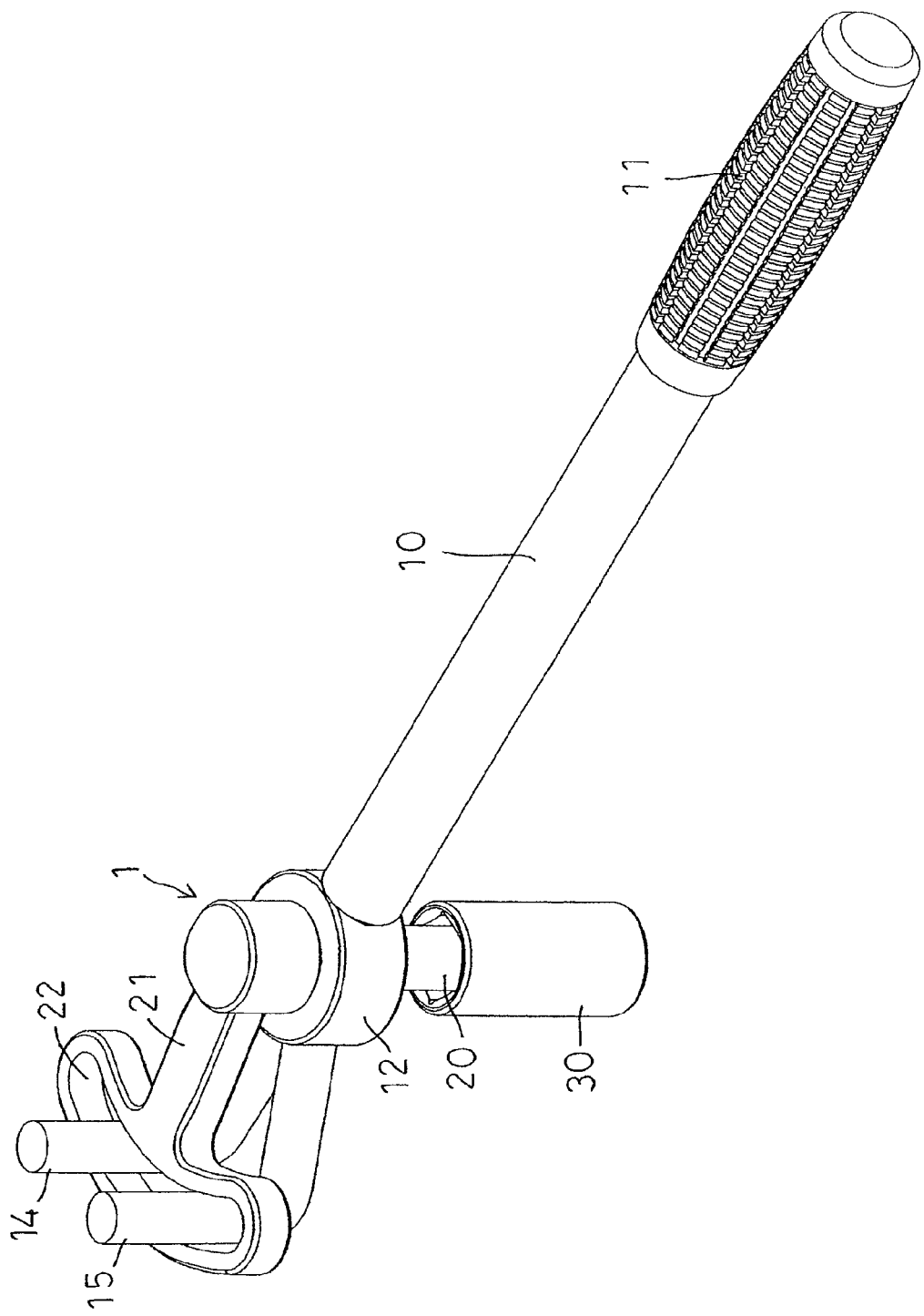
FIG. 1 is a perspective view of a socket wrench in accordance with the preferred embodiment of the present invention.
Figure 2:
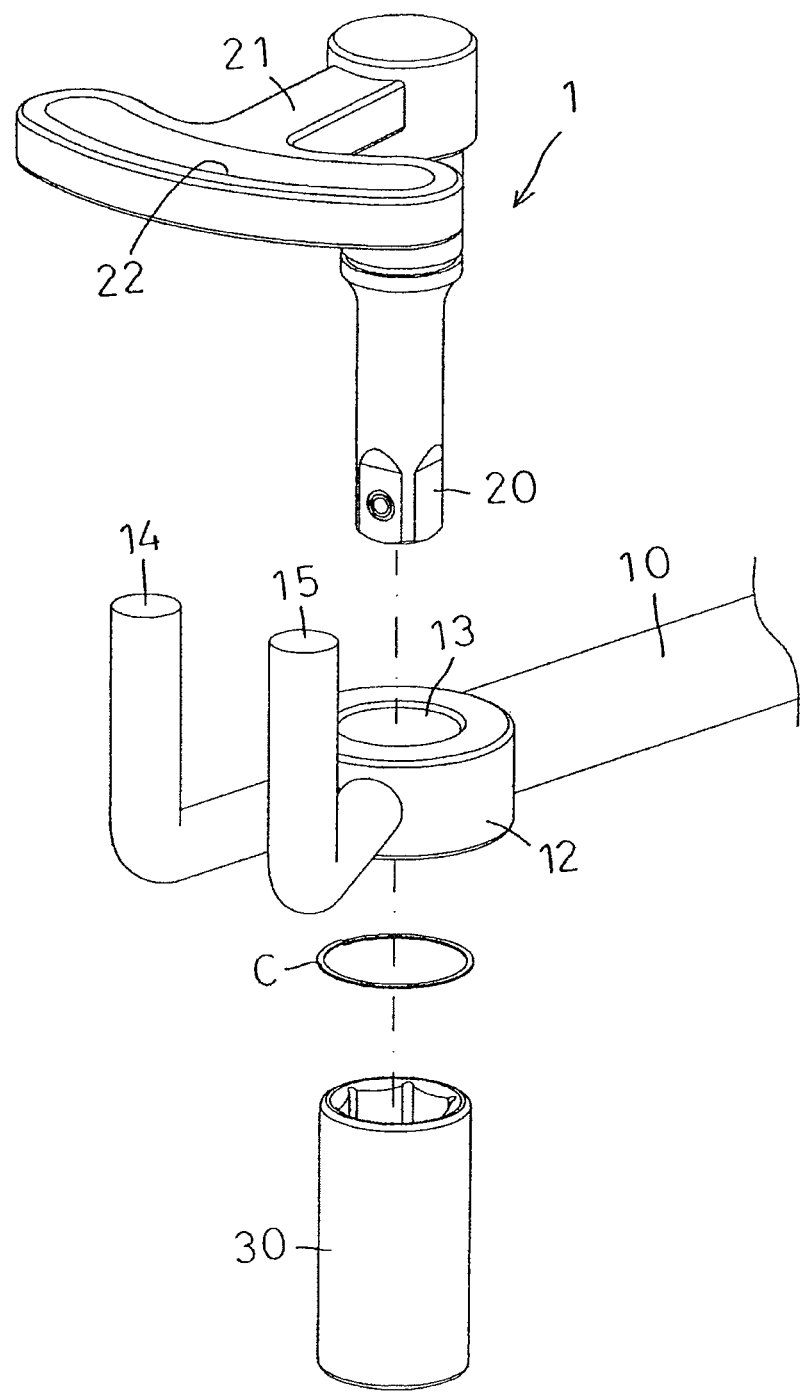
FIG. 2 is an exploded perspective view of the socket wrench as shown in FIG. 1.
Figure 3:
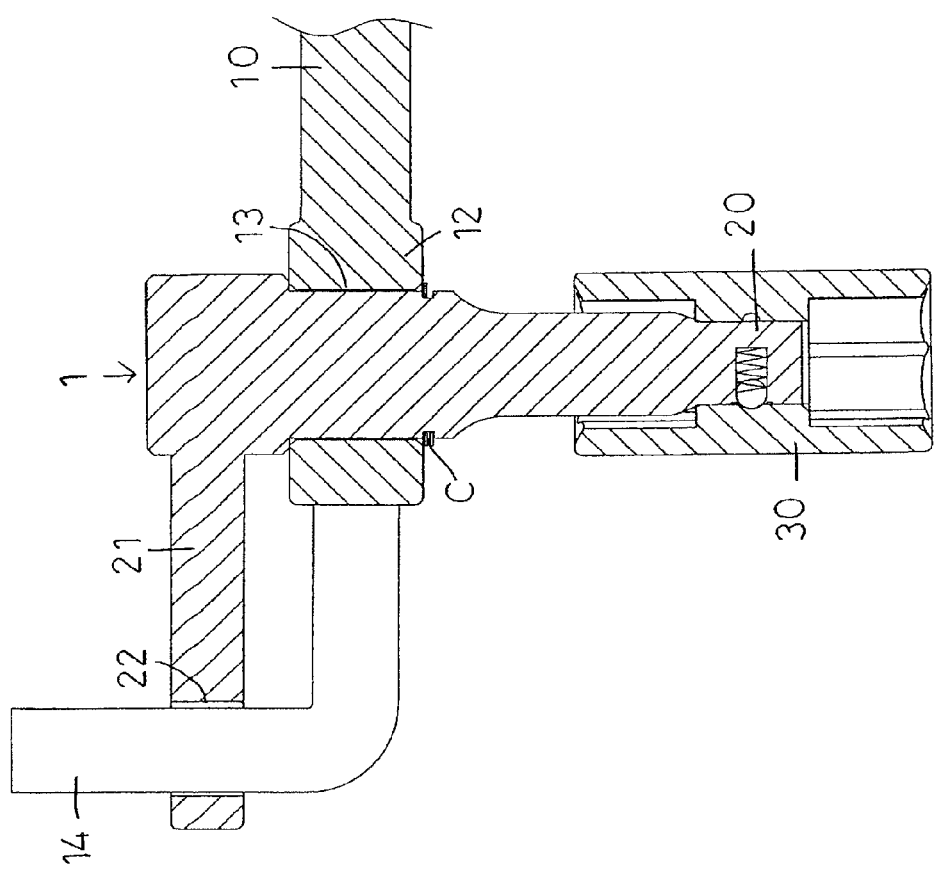
FIG. 3 is a front cross-sectional view of the socket wrench as shown in FIG. 1.
Figure 4:
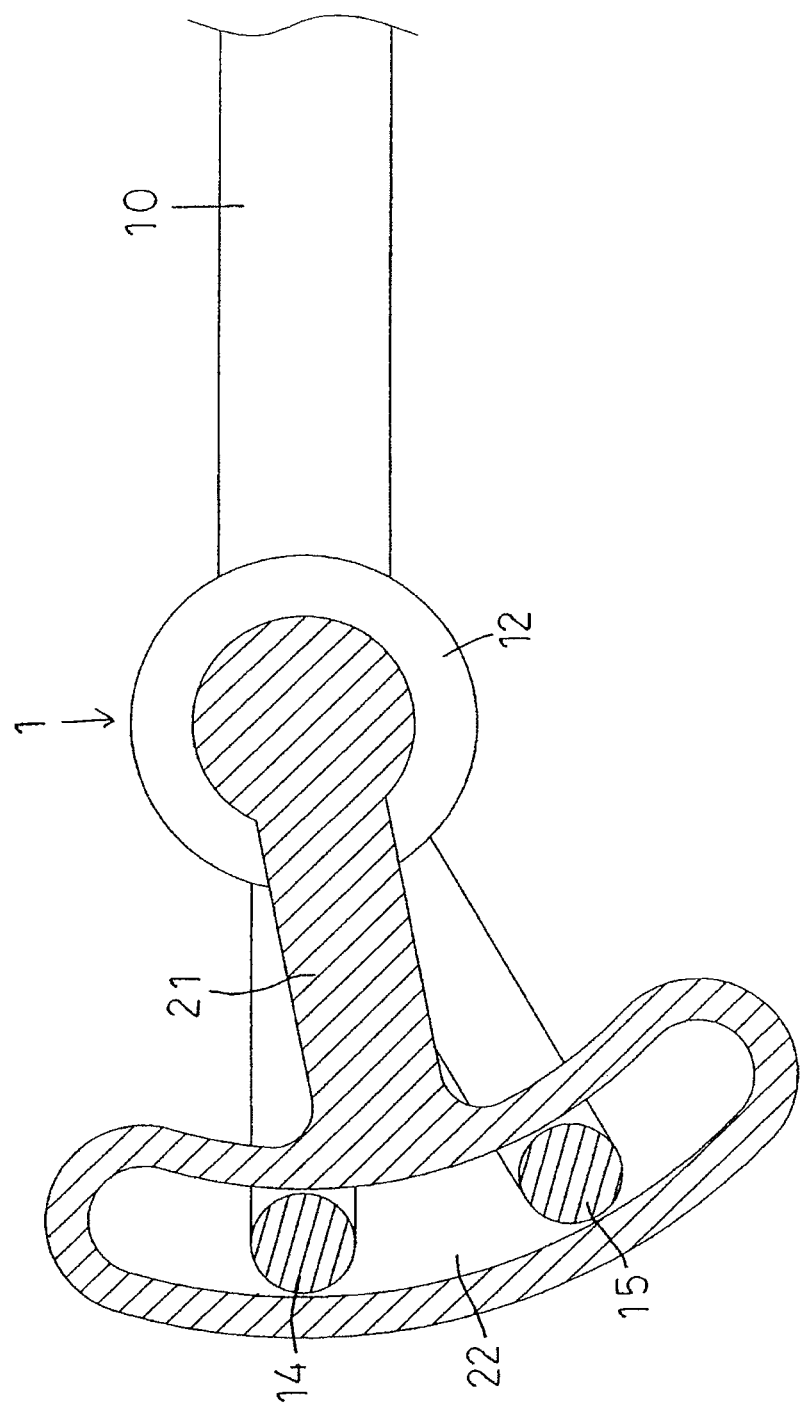
FIG. 4 is a top cross-sectional view of the socket wrench as shown in FIG. 1.

Referring to the drawings and initially to FIGS. 1-4, a socket wrench 1 in accordance with the preferred embodiment of the present invention comprises a handle 10 and an actuating head 20 connected with the handle 10.

The handle 10 has a fixed length or a retractable length. The handle 10 has a first end provided with a mounting portion 12 and a second end provided with a grip 11. The mounting portion 12 of the handle 10 is mounted on the actuating head 20. The mounting portion 12 of the handle 10 has an inner wall provided with a pivot hole 13. The pivot hole 13 of the handle 10 is pivotally mounted on the actuating head 20. The mounting portion 12 of the handle 10 has an outer wall provided with a first driving arm 14 and a second driving arm 15. The first driving arm 14 of the handle 10 has a substantially L-shaped profile. The second driving arm 15 of the handle 10 has a substantially L-shaped profile.

The actuating head 20 is connected with the mounting portion 12 of the handle 10 by a snap ring "C". The snap ring "C" is secured on the actuating head 20 and abuts a bottom side of the pivot hole 13 of the handle 10.

The actuating head 20 is extended through the pivot hole 13 of the handle 10. The actuating head 20 has an upper end provided with an extension 21 protruding outward from the mounting portion 12 of the handle 10. The extension 21 of the actuating head 20 has a distal end provided with an elongate guide slot 22 which receives the first driving arm 14 of the handle 10 and the second driving arm 15 of the handle 10 so that each of the first driving arm 14 and the second driving arm 15 of the handle 10 is slidably mounted in the guide slot 22 of the actuating head 20. The guide slot 22 of the actuating head 20 has a substantially arc-shaped profile. The actuating head 20 has a lower end protruding outward from the mounting portion 12 of the handle 10 and inserted into a socket 30.

Figure 5:
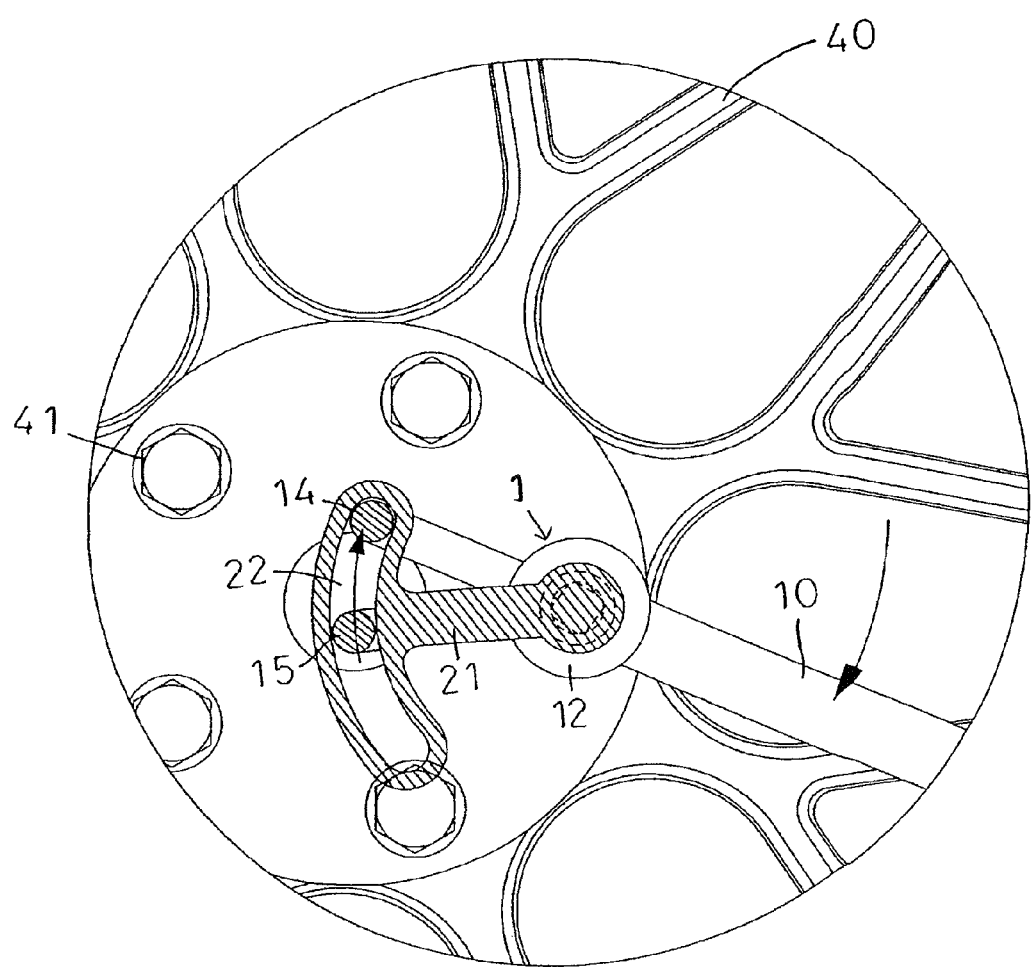
FIG. 5 is a schematic operational view of the socket wrench as shown in FIG. 4 in use.
Figure 6:
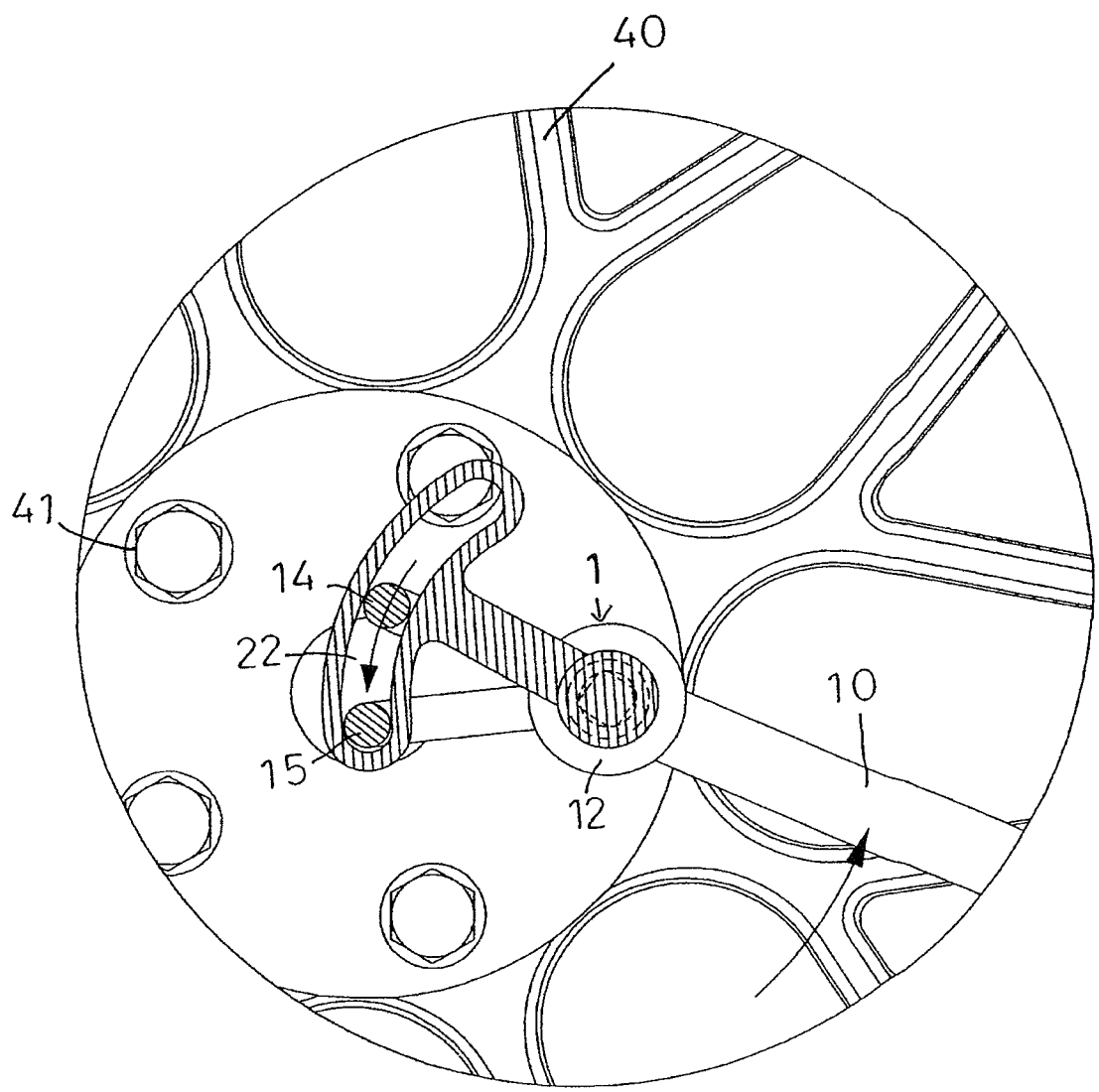
FIG. 6 is a schematic operational view of the socket wrench as shown in FIG. 4 in use.

In operation, referring to FIGS. 5 and 6 with reference to FIGS. 1-4, the socket 30 is mounted on one of a plurality of bolts 41 of a wheel 40. At this time, the actuating head 20 is fixed on the socket 30, and the pivot hole 13 of the handle 10 is pivotally mounted on the actuating head 20 so that each of the first driving arm 14 and the second driving arm 15 of the handle 10 is slidable in the guide slot 22 of the actuating head 20 when the mounting portion 12 of the handle 10 is rotatable relative to the actuating head 20. In such a manner, when the handle 10 is driven and rotated in the clockwise direction as shown in FIG. 5, the first driving arm 14 of the handle 10 is moved to abut one end of the guide slot 22 of the actuating head 20 so that the extension 21 of the actuating head 20 is driven by the first driving arm 14 of the handle 10, and the actuating head 20 is driven by the extension 21 to rotate the socket 30 which rotates one of the bolts 41 of a wheel 40 in the clockwise direction. On the contrary, when the handle 10 is driven and rotated in the counterclockwise direction as shown in FIG. 6, the second driving arm 15 of the handle 10 is moved to abut the other end of the guide slot 22 of the actuating head 20 so that the extension 21 of the actuating head 20 is driven by the second driving arm 15 of the handle 10, and the actuating head 20 is driven by the extension 21 to rotate the socket 30 which rotates one of the bolts 41 of the wheel 40 in the counterclockwise direction.

Accordingly, each of the first driving arm 14 and the second driving arm 15 of the handle 10 produces a leverage to the extension 21 to drive the actuating head 20 and the socket 30 so as to rotate each of the bolts 41 of the wheel 40 in an energy-saving manner, thereby facilitating a user operating the handle 10 to rotate each of the bolts 41 of the wheel 40.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A socket wrench, comprising:
    a handle; and
    an actuating head connected with the handle;
    wherein the handle has a first end provided with a mounting portion and a second end provided with a grip;
    the mounting portion of the handle is mounted on the actuating head;
    the mounting portion of the handle has an inner wall provided with a pivot hole;
    the pivot hole of the handle is pivotally mounted on the actuating head;
    the mounting portion of the handle has an outer wall provided with a first driving arm and a second driving arm;
    the first driving arm of the handle has a substantially L-shaped profile;
    the second driving arm of the handle has a substantially L-shaped profile;
    the actuating head is connected with the mounting portion of the handle by a snap ring;
    the snap ring is secured on the actuating head and abuts a bottom side of the pivot hole of the handle;
    the actuating head is extended through the pivot hole of the handle;
    the actuating head has an upper end provided with an extension protruding outward from the mounting portion of the handle;
    the extension of the actuating head has a distal end provided with an elongate guide slot which receives the first driving arm of the handle and the second driving arm of the handle;
    each of the first driving arm and the second driving arm of the handle is slidably mounted in the guide slot of the actuating head;
    the guide slot of the actuating head has a substantially arc-shaped profile.

2. The socket wrench of claim 1, wherein the handle has a fixed length or a retractable length.

3. The socket wrench of claim 1, wherein the actuating head has a lower end protruding outward from the mounting portion of the handle and inserted into a socket.

* * * * *